(12) United States Patent  (10) Patent No.: US 7,503,736 B1
Chen  (45) Date of Patent: Mar. 17, 2009

(54) RETRACTABLE TIE-DOWN WITH ROTATION BRAKE

(76) Inventor: Weiguo Chen, Ningbo Xuli Metal Products Co., Ltd, Yongie Village, Wuxiang Zhen, Yinzhou District, Ningbo, Zhejiang (CN) 315112

( * ) Notice: Subject to any disclaimer, the term of this patent is extended or adjusted under 35 U.S.C. 154(b) by 366 days.

(21) Appl. No.: 11/466,188

(22) Filed: Aug. 22, 2006

(51) Int. Cl.
*B61D 45/00* (2006.01)
(52) U.S. Cl. ...................................... 410/100
(58) Field of Classification Search ............ 410/7, 410/9–12, 19, 21–23, 97, 100, 103; 248/499; 254/217, 223, 243, 245, 247, 330, 345, 346, 254/352, 355–357, 365, 369, 376
See application file for complete search history.

(56) References Cited

U.S. PATENT DOCUMENTS

| | | | | |
|---|---|---|---|---|
| 3,099,055 A | * | 7/1963 | Huber | 410/103 |
| 3,409,263 A | * | 11/1968 | Jantzen | 410/103 |
| 5,560,086 A | * | 10/1996 | Huang | 24/68 CD |
| 6,139,234 A | * | 10/2000 | Huang | 410/103 |
| 6,457,701 B1 | * | 10/2002 | Huang | 254/217 |
| 7,412,754 B2 | * | 8/2008 | Hanson | 24/68 CD |

* cited by examiner

*Primary Examiner*—H Gutman
(74) *Attorney, Agent, or Firm*—David L. Tingey

(57) ABSTRACT

The retractable tie-down provides an adjustable strap under control of a rotation brake during retraction and pay-out. The rotation brake impedes rotation of a spool on which the strap is wrapped and unwrapped during retraction and pay-out of the strap as the tie-down operates in one of either a pay-out mode or a retraction mode. Thus, the rate of retraction of the strap is user-controlled through the rotation brake. The tie-down is provided with a lanyard issuing from rearward from the tie-down and a strap issuing forward from the tie-down for securement without direct, or positive attachment of the tie down to an anchor point, such as a chassis of a vehicle or the like.

21 Claims, 7 Drawing Sheets

RETRACTABLE TIE-DOWN WITH ROTATION BRAKE

BACKGROUND

1. Field of the Invention

This invention relates to tie-downs, as may be used to secure a load to a vehicle, and more particularly to a tie down with a rotation brake.

2. Prior Art

It is known to have tie down assembly that secures a load to a vehicle. Typical is that tie-down assembly disclosed by Anthony et al. in U.S. Pat. No. 5,282,706 in which Anthony et al. describes an assembly secured directly to a chassis with a strap issuing therefrom for connection around or to a load. The strap is wrapped around a spool and unwound on release to pay out as necessary. When the strap is secured about the load, the strap is released and it automatically retracts around the spool.

The tie-down assembly of the prior art functions well as designed. However, it does not provide for the strap to remain in pay-out while not attached to an anchor point, retracting around its spool when it is released by the user. This is often inconvenient to its use as its user often prefers to have the strap in pay-out and unattached while a load is adjusted or the manner in which the load is secured is configured. It may also be inconvenient to mount the tie down positively to a chassis or the like. It would be preferred to have a lanyard issuing from rearward of the tie-down and releasably secured to a first anchor position and the strap adjustably issuing from forward of the tie-down and releasably secured to a second anchor position with the tie-down between the anchor positions. Thus, the tie-down without an automatic retraction functions as an adjustable strap that can be tightened by retraction of the strap at a preferred time.

SUMMARY OF THE INVENTION

The retractable tie-down of the present invention provides an adjustable strap under control of a rotation brake during retraction and pay-out. The rotation brake impedes rotation of a spool on which the strap is wrapped and unwrapped during retraction and pay-out of the strap. Thus, the rate of retraction of the strap is user-controlled through releasing or partially releasing the rotation brake. The tie-down is provided with a lanyard issuing from rearward from the tie-down and a strap issuing forward from the tie-down for securement without direct, or positive attachment of the tie down to an anchor point, such as a chassis of a vehicle or the like.

The tie-down is configurable between a pay-out mode or configuration and a retraction mode or configuration. With the tie-down assembly in pay-out mode the user pulls the strap out as it unwinds from a spool against resistance of the rotation brake. At any arbitrary pay-out position of the strap, the user can release the strap it remains in its present pay-out position due to action of the rotation brake that prevents the spool from rewinding the strap. The user also has the option of again pulling the strap to a further pay-out position at any time with the same result—the strap maintains its position.

The strap is tightened about a load and/or rewound from a pay-out position onto the spool only when the tie-down is moved to its retraction mode. Reconfiguration between modes requires positive action by the user so there is no inadvertent switch between operation modes. In retract mode, a handle is repeatedly lifted and lowered in effecting a ratcheting of the spool in retraction rotation as a handle pawl engages a ratchet wheel attached to the spool and an adjusting lock secures the spool from releasing when the handle is lowered in normal ratcheting operation. With the handle in a range of motion for retracting the strap, a cam moves the rotation brake away from the ratchet wheel allowing the ratchet wheel to freely rotate through the ratcheting mechanism. The tie-down is changed to pay-out mode by moving the handle down beyond normal ratcheting range of motion into a locked position by which the rotation lock is also withdrawn from the ratchet wheel allowing it to rotate, with the cam withdrawn that moves the rotation brake away from ratchet wheel. Thus, in pay-out mode the strap is pulled by the user under resistance provided by the rotation brake but with such measured resistance that allows the strap to be pulled but with sufficient resistance to prevent the strap from automatically winding on the spool under bias of a spool spring.

The handle in pay-out mode is moved downward and rearward of the spool and in ratchet mode is moves from rearward of the spool to forward of the spool, requiring a maximum range of motion of the handle on its frame rotating about the spool axis. This maximum range of motion is achieved with the rotation brake engaging the ratchet wheel rearward and mostly under the ratchet wheel. Likewise, the rotation lock is in the assembly frame forward of the spool, thus allowing the handle movement to range between the rotation brake and the rotation lock. The rotation brake is advantageously rearward in the frame assembly to allow the strap to unwind forward from the spool without interference from the rotation brake. With the rotation brake low and rearward of the spool, the rotation lock is advantageously located forward of the spool free from interference with the rotation brake and the handle.

DETAILED DESCRIPTION OF THE PREFERRED EMBODIMENT

Figure 1:
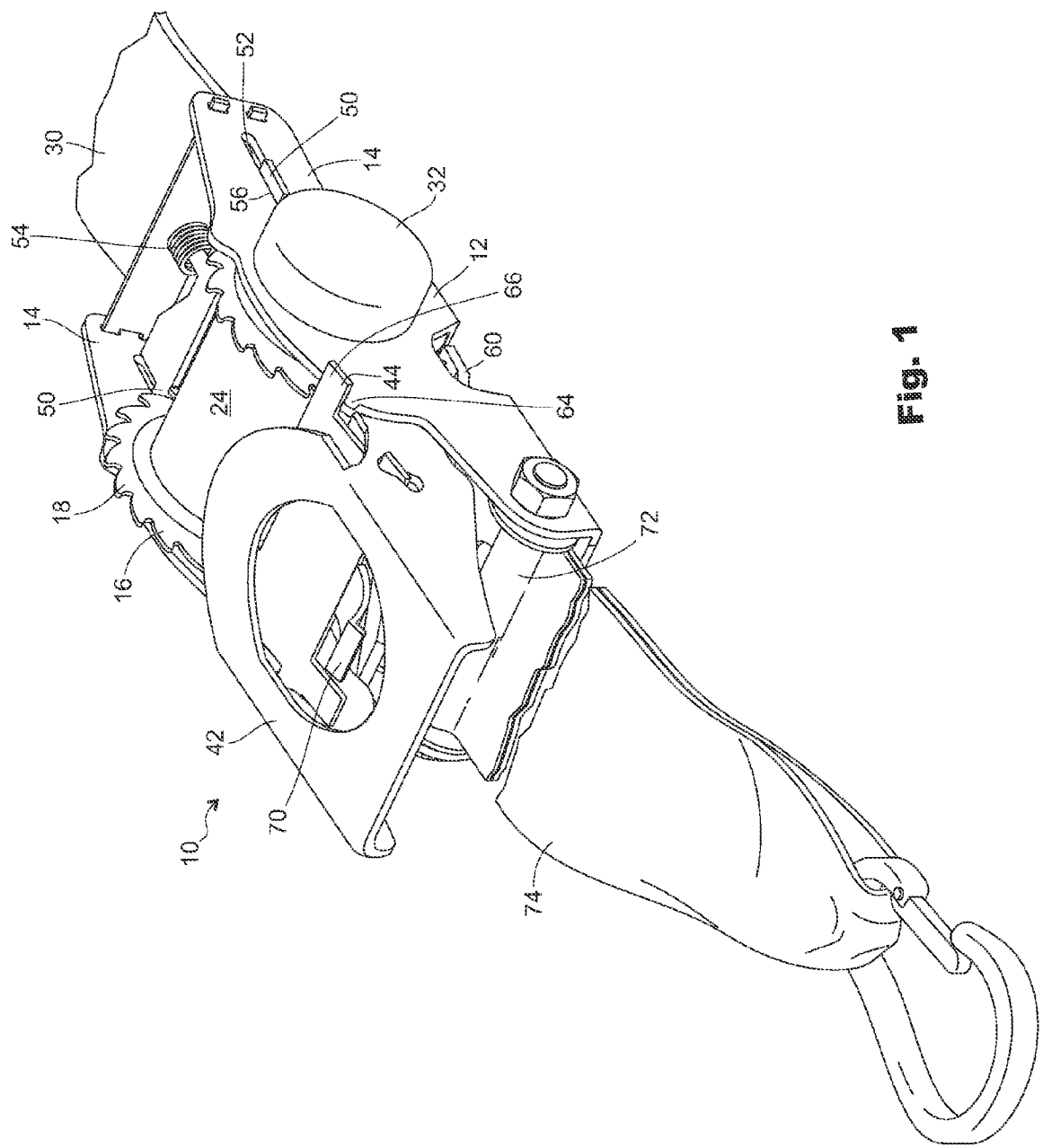
FIG. 1 is a perspective view of the retractable tie-down assembly of the present invention.
Figure 2:
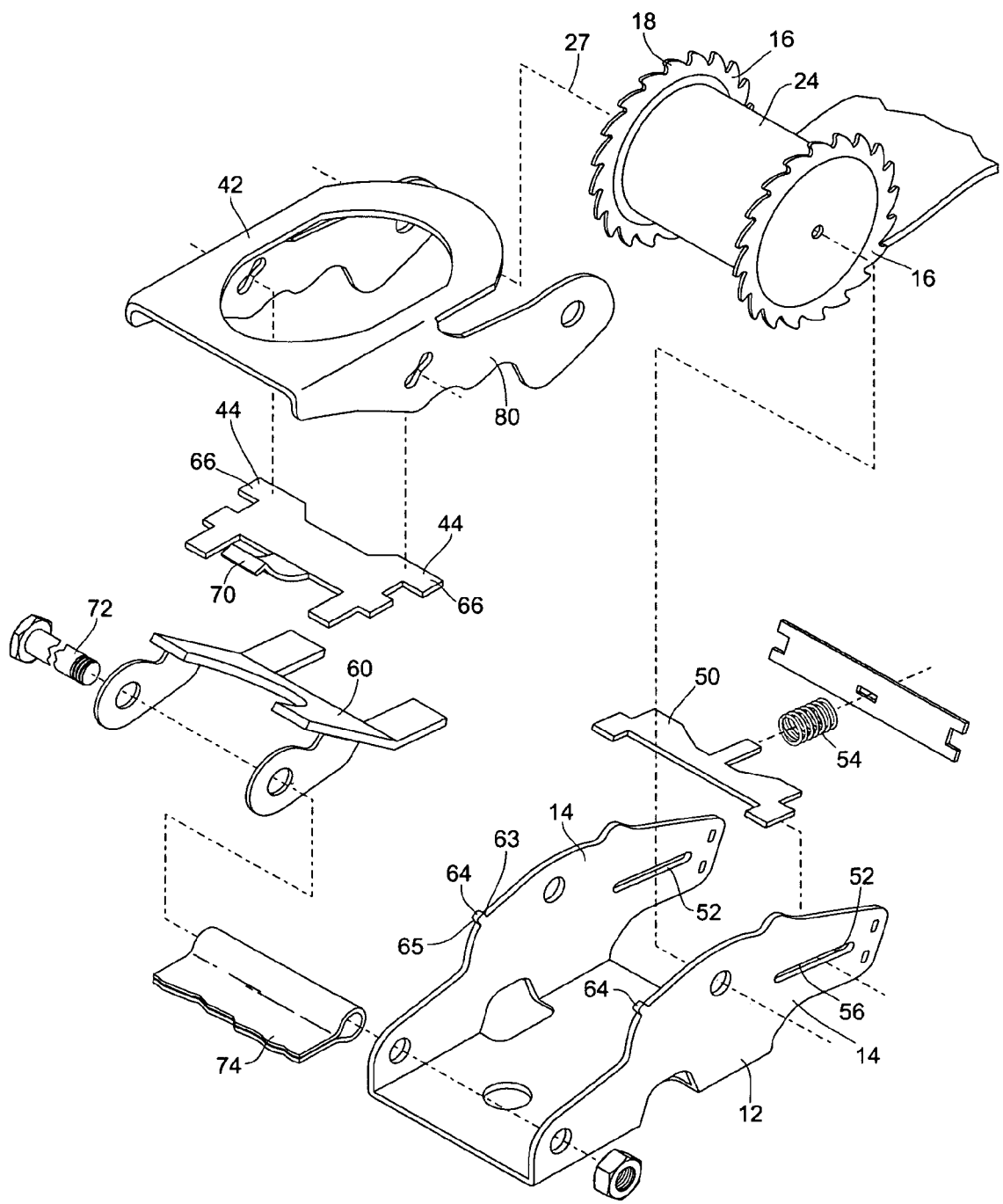
FIG. 2 is an exploded view of the retractable tie-down assembly of FIG. 1.
Figure 3:
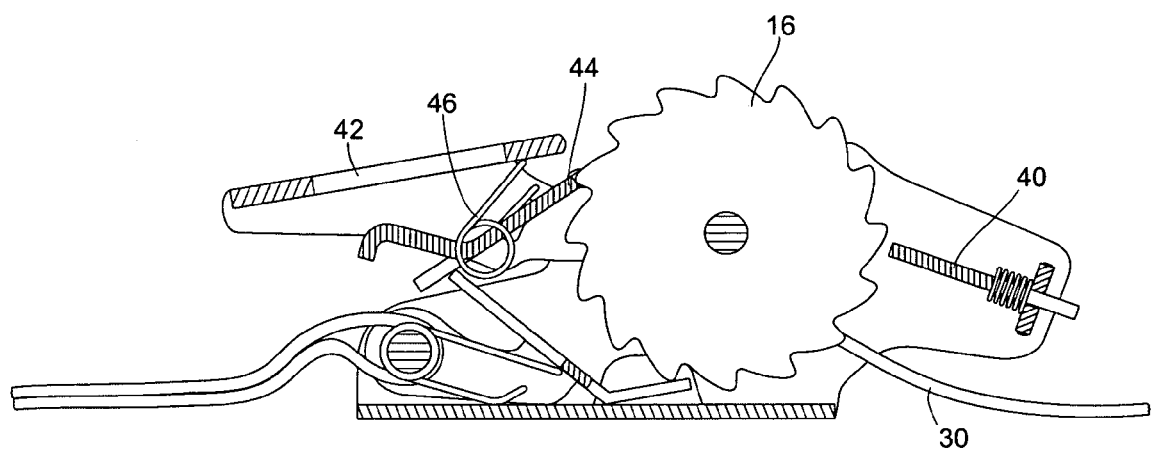
FIG. 3 is a side cut-away view of the retractable tie-down assembly in retract, or ratchet configuration.
Figure 4:
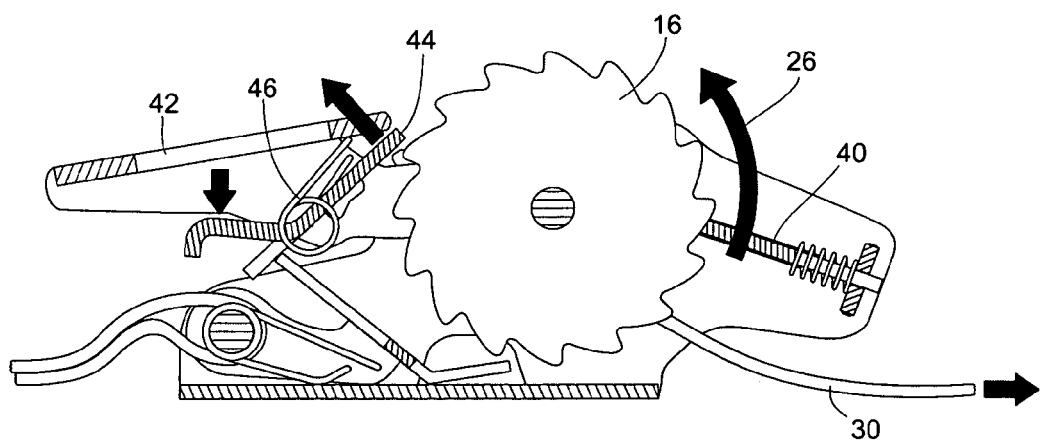
FIG. 4 is a side cut-away view of the retractable tie-down assembly in pay out configuration with the release lever depressed, lifting the pawl out of engagement with the ratchet wheel.
Figure 5:
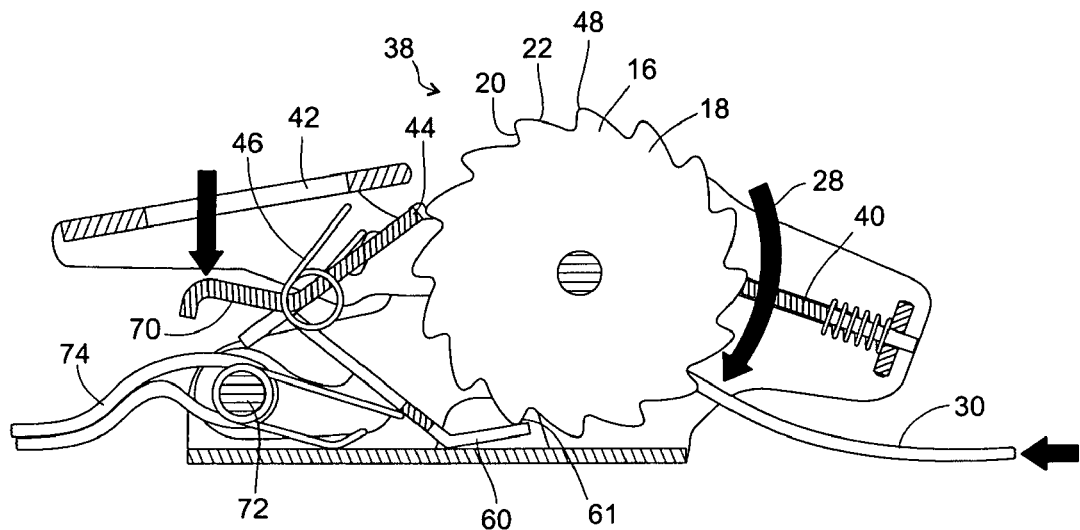
FIG. 5 is a side cut-away view of the retractable tie-down assembly of FIG. 3 in retract, or ratchet configuration, shown with the release lever partially depressed, moving between pay-out and ratchet configurations.
Figure 6:
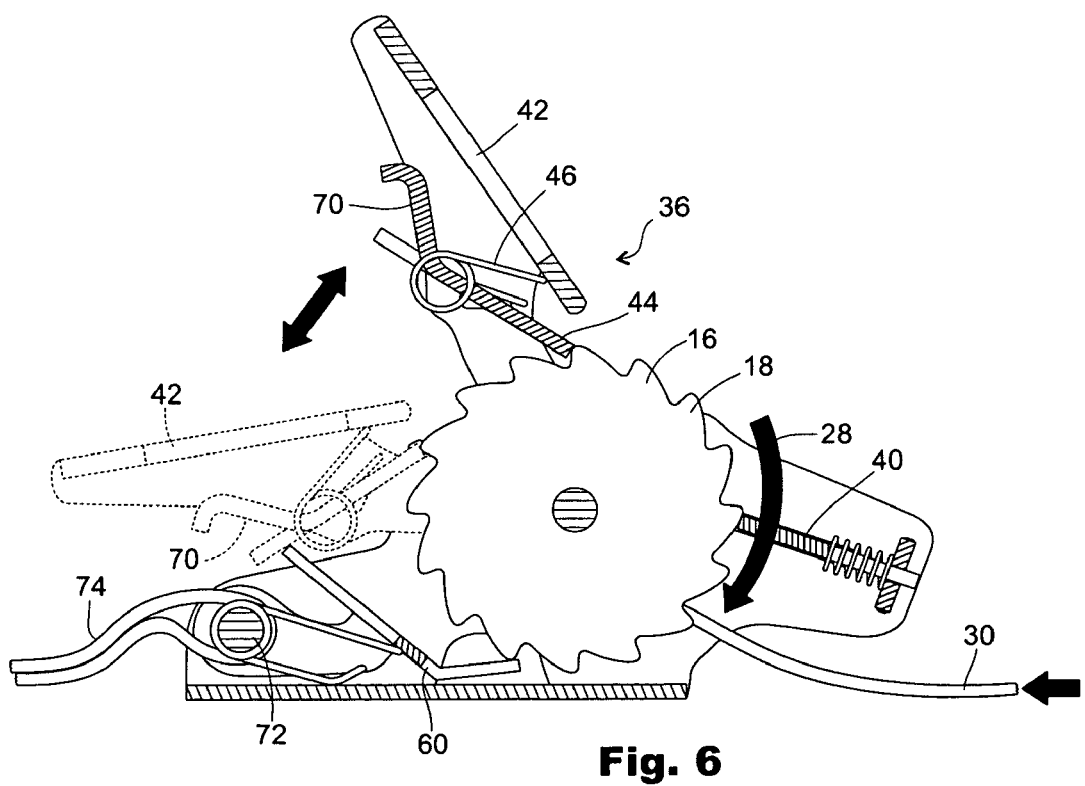
FIG. 6 is a side cut-away view of the retractable tie-down assembly of FIG. 1 in retract configuration showing the handle and pawl rotating in engagement with the ratchet wheel.
Figure 7:
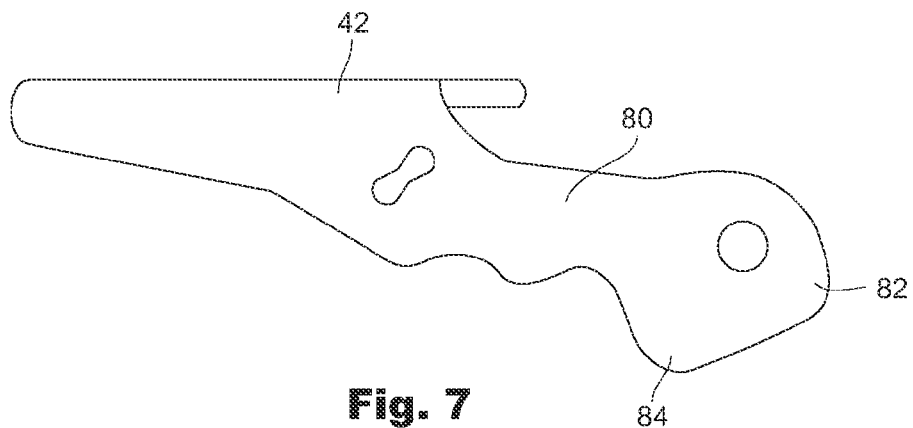
FIG. 7 is a side view of the handle and handle frame.
Figure 8:
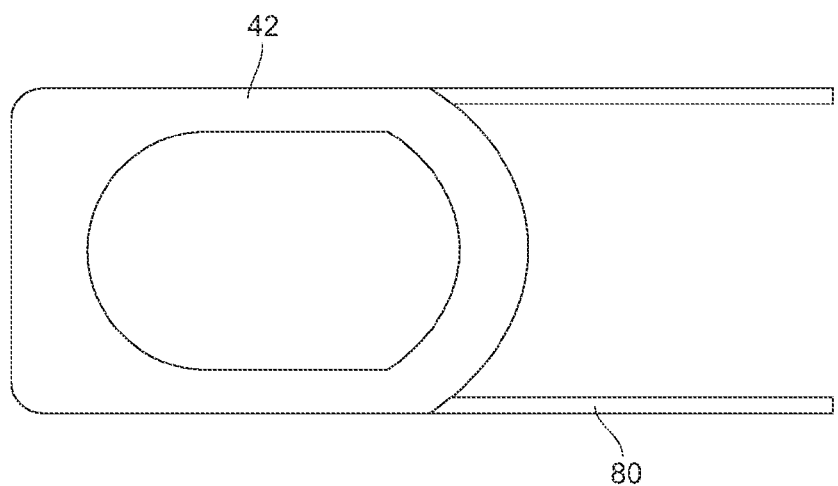
FIG. 8 is a top view of the handle and handle frame.
Figure 9:
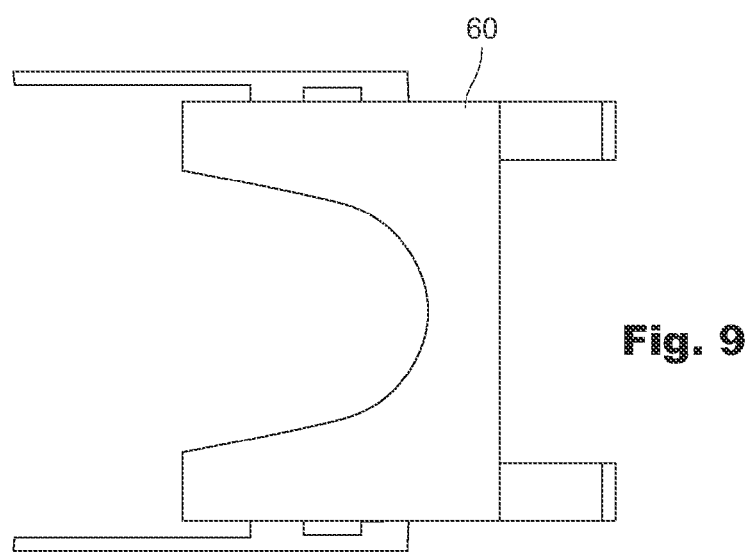
FIG. 9 is a top view of the rotation brake.
Figure 10:
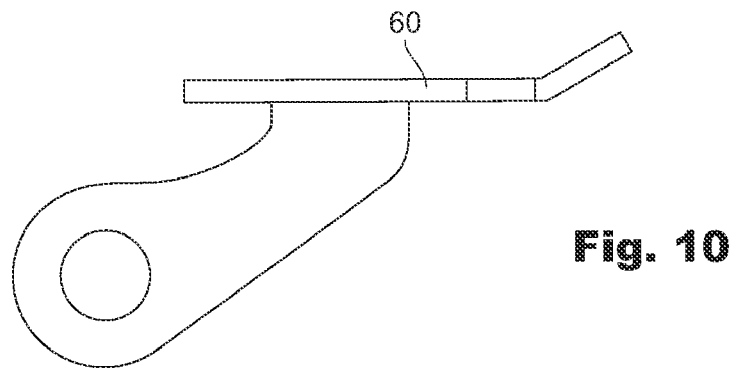
FIG. 10 is a side view of the rotation brake.
Figure 11:
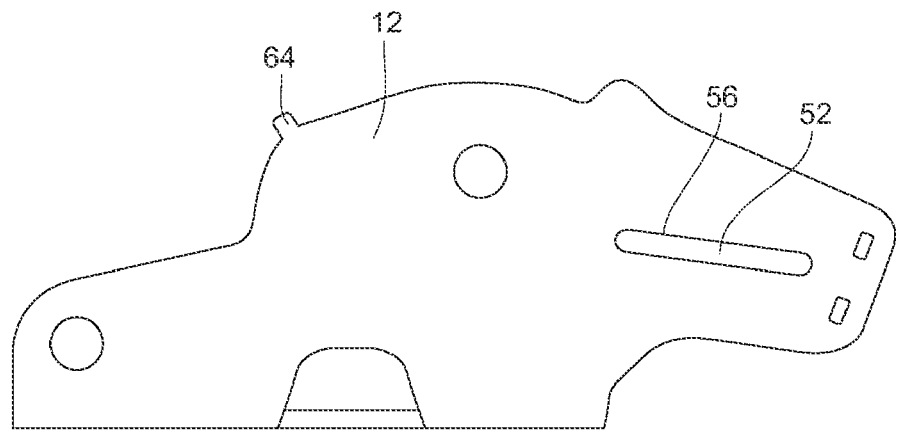
FIG. 11 is a side view of the assembly frame.
Figure 12:
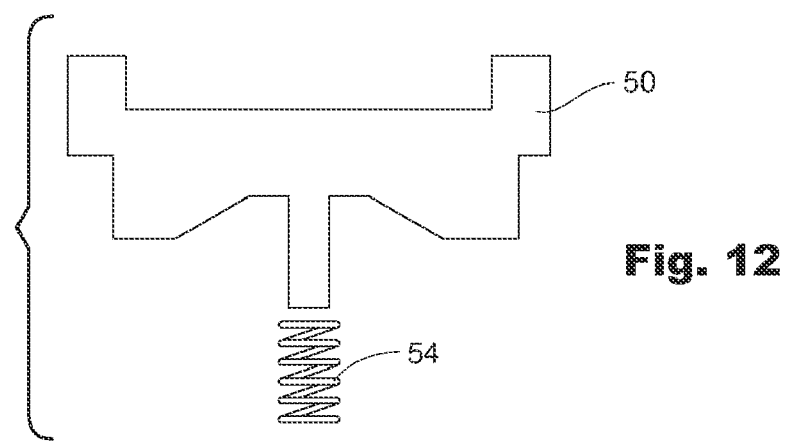
FIG. 12 is a top view of the rotation lock.
Figure 13:
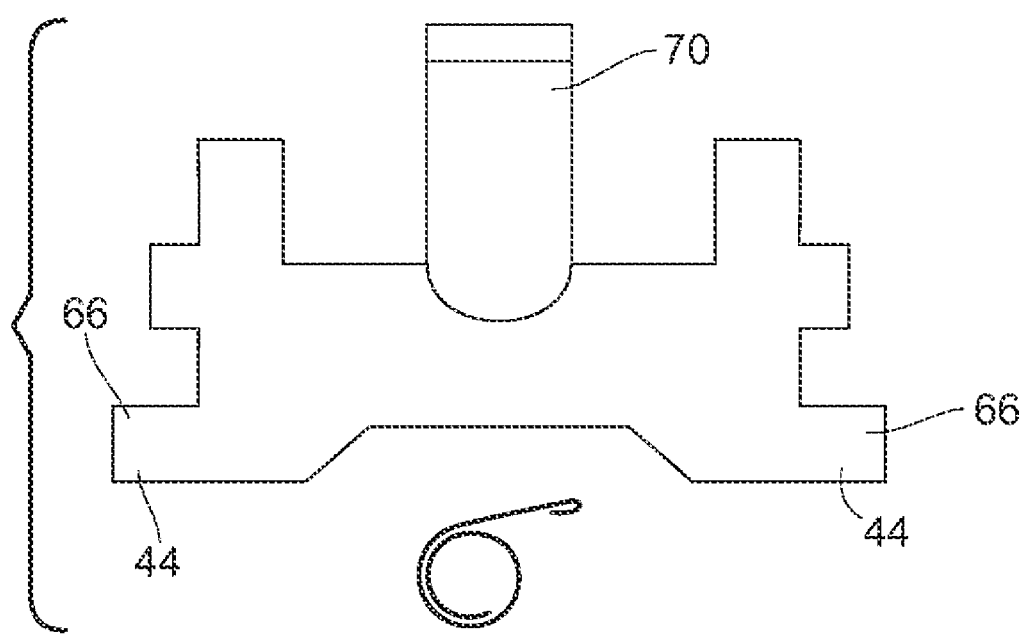
FIG. 13 is a top view the release lever.

The retractable tie-down assembly 10 of the present invention includes an assembly frame 12 having a pair of spaced apart side walls 14. A spool 24 is rotatably mounted on a spool axis 27 between the side walls 14 rotatable in a pay out direction 26 and a retracting direction 28. A ratchet wheel 16 is secured on one or both ends of the spool 24. A spool spring 32 between the spool 24 and the assembly frame 12 biases the spool 24 to rotate in retraction. A strap 30 is wrappable on the spool 24 with one strap end attached thereto.

A handle 42 is movably mounted to the assembly frame 12 and includes a pawl 44 under continuous bias of a pawl spring 46 that urges the pawl 44 toward engagement with the radial side 20 of the ratchet wheel teeth 18 when the handle 42 is lifted. When the handle 42 is further lifted, the ratchet wheel 16 is rotated in strap retraction, or retracting direction 28. When the handle 42 is lowered, the pawl 44 rides on the taper side 22 of one of the teeth 18 until it falls over to the radial side 20 of the tooth 18 where it is ready to push against the radial side 20 of the tooth 18 as the handle 42 is again lifted. Thus the handle 42 operates to ratchet the ratchet wheel 16 to rotate in the retracting direction 28.

When the assembly 10 is in ratchet configuration, the rotation lock 40 remains in locking position engaged with teeth 18 of the ratchet wheel 16 while the handle 42 is movable to ratchet the ratchet wheel 16. The rotation lock 40 is under spring bias toward a locking position, or in engagement with the ratchet wheel 16, and, as with the pawl 44, rides on the curved taper side 22 of a ratchet wheel tooth 18 to a tooth apex 48 until the rotation lock 40 slips over the apex 48 into engagement with the radial side 20 of the ratchet wheel tooth 18 in position to move over a next tooth similarly as the ratchet wheel 16 rotates. As the handle 42 is moved downward into the pay-out configuration 26, the pawl 44 of the handle is withdrawn from engagement with the ratchet wheel 16.

The rotation lock 40 comprises a lock plate 50 extending through slits 52 forward in the assembly frame 12. The rotation lock plate 50 is urged forward in the slits 52 under bias of a lock spring 54 secured between the assembly frame 12 and the lock plate 50. As the lock plate 50 engages a tooth 18 of the ratchet wheel 16 the lock plate 50 is pushed against upper sides 56 of the slits 52 and prevented from upward movement by those upper sides 56 therein binding the lock plate 50 from rotation and locking the ratchet wheel 16 from rotation.

A rotation brake 60 that engages the tapered side 22 and/or apex 48 of said ratchet teeth 18 at an underside 61 of the ratchet wheel is pivotably mounted to the assembly frame 12 and urged against at least one tooth 18 of the ratchet wheel 16 under a spring bias which results in a frictional engagement between the ratchet wheel 16 and the rotation brake 60 sufficient to prevent retraction rotation under bias of spool spring 32 while allowing the ratchet wheel 16 to rotate in pay out direction under frictional resistance of the rotation brake 60.

A limiter 64 is provided on the assembly frame 12 that divides motion of the handle 42 between the ratchet configuration 36 and the pay out configuration 38. The handle 42 comprises a limiter latch 66 either engaging the limiter 64 on a limiter first side 63 above the limiter 64 in the ratchet configuration 36 or engaging the limiter 64 on a limiter second side 65 below the limiter 64 in the pay out configuration 38. Thus, the limiter prevents the handle from inadvertently moving out of each configuration. In the preferred embodiment, the handle pawl 44 also functions as the limiter latch 66.

A release lever 70 extends from the limiter latch 66 and is configured such that when it is depressed, the limiter latch 66 is raised above the limiter 64 to enable movement of the limiter latch 66 between the ratchet and pay-out configurations 36, 38. With the limiter latch 66 below the limiter 64 in pay-out configuration 36, the only engagement with the ratchet wheel teeth 18 is the rotation brake 60 under spring bias. Thus the ratchet wheel 16 is allowed to rotate in pay-out rotation when the strap 30 is pulled sufficiently to overcome frictional resistance of the rotation brake 60. Until the strap 30 is so pulled, the rotational resistance provided by the rotation brake 60 is sufficient to prevent retraction of the ratchet wheel 18 so the strap 30 remains in its last pay-out position. The tie down assembly 10 remains in pay-out configuration 38 amenable to further pay-out after a first pay-out by only pulling the strap 30 until the strap is fully unwound from the spool 24. The release lever 70 is also connected to the rotation brake 60 such that depressing the release lever 70 withdraws the rotation brake 60 from the ratchet wheel 18 progressively as the release lever 70 is depressed such that the strap 30 can be retracted by releasing or partially releasing the rotation brake 60 by depressing the release lever 70. Thus, the rate of retraction is user-controlled by partial release of the rotation brake 60.

The handle 42 is connected to a handle frame 80 that is rotatably mounted to the assembly frame 12 on the spool axis 27. A forward cam 82 on the handle frame 80 urges the rotation lock 40 away from the ratchet wheel 16 when the handle 42 is moved downward into said pay out configuration 38. The handle frame further comprises a rearward cam 84 that also urges the rotation brake 60 away from the ratchet wheel 16 when the handle 42 is moved upward into the ratchet configuration 28. As the handle 42 is lowered into pay out configuration 38, the forward cam 82 moves the lock plate 50 away from the ratchet wheel.

A transverse shaft 72 is located rearward in the assembly frame 10 with the rotation brake 60 pivotably secured thereto. A lanyard 74 is secured to the shaft 72 and extends therefrom rearward from the assembly 10 such that the strap 30 can be secured to a forward anchor point (not shown) and the lanyard 74 can be secured to a rearward anchor point (not shown) with the tie down assembly 10 therebetween.

Having described the invention, what is claimed is as follows:

1. A retractable tie-down assembly including an assembly frame, a spool with a spool axis rotatably mounted on the assembly frame and rotatable in a pay out direction and a retracting direction, at least one ratchet wheel on ends of the spool, the ratchet wheel including ratchet teeth on the ratchet wheel, a strap adapted to be wound on and unwound from said spool with one end attached thereto, a ratcheting handle on a handle frame pivotably connected to the assembly frame and configured to optionally engage said ratchet wheel to rotate said spool in said retracting direction, the improvement comprising, the tie-down assembly configurable between a ratchet configuration and a pay out configuration, in which (a) in the ratchet configuration, the handle includes a pawl under spring bias toward continuous engagement of the pawl with said ratchet wheel such that when the handle alone is lifted, the handle and ratchet wheel cooperating to ratchet said spool to rotate in said retracting direction, and a rotation lock mounted to said assembly frame adapted to lock said ratchet wheel against rotation in said pay out direction by engaging the ratchet wheel, wherein said rotation lock remains in a locking position when said handle is movable to ratchet said ratchet wheel, the rotation lock being under spring bias toward the locking position therein allowing the ratchet wheel to rotate in said retracting direction but preventing the ratchet wheel from rotating in said pay out direction, and (b) in the pay out configuration, said handle is moved downward out of the ratchet configuration effecting a withdrawal of the pawl from engagement with the ratchet wheel and a withdrawal of the rotation lock from engagement with the ratchet wheel, and further comprising a rotation brake pivotably mounted to said assembly frame and urged against the ratchet wheel under a spring bias resulting in a frictional engagement between the ratchet wheel and the rotation brake sufficient to prevent rotation of the ratchet wheel in the retracting direction while allowing the ratchet wheel to rotate in the pay out direction under frictional resistance of the rotation brake.

2. The tie-down assembly of claim 1 wherein the rotation lock comprises a lock plate forward in the assembly frame engaging the ratchet wheel.

3. The tie down assembly of claim 2 wherein the rotation lock comprises said lock plate extending through slits forward in the assembly frame, urged forward in the slits under bias of a lock spring between the assembly frame and the lock plate and wherein as the lock plate engages the ratchet wheel the lock plate is pushed against upper sides of the slits therein binding the lock plate from rotation and locking the ratchet wheel from rotation.

4. The tie-down assembly of claim 1 wherein the handle frame mounts to the assembly frame rotatably on the spool axis and further comprising a forward cam on the handle frame urging the rotation lock away from the ratchet wheel when the handle is urged down into said pay out configuration.

5. The tie-down assembly of claim 4 wherein the handle frame mounts to the assembly frame rotatably on the spool axis, the handle frame comprising a rearward cam urging the rotation brake away from the ratchet wheel when the handle is urged down into said pay out configuration.

6. The tie-down assembly of claim 1 wherein the handle frame mounts to the assembly frame rotatably on the spool axis, the handle frame comprising a rearward cam urging the rotation brake away from the ratchet wheel when the handle is urged down into said pay out configuration.

7. The tie down assembly of claim 1 further comprising a limiter on said assembly frame dividing handle motion between said ratchet configuration and said pay out configuration and further comprising a limiter latch engaging said limiter on a first side of said limiter in said ratchet configuration or engaging said limiter on a second side of said limiter in said pay out configuration, the limiter preventing the handle from moving out of each of said configurations.

8. The tie down assembly of claim 7 further comprising a release lever extending from said limiter latch configured such that when said release lever is depressed, the limiter latch is raised above said limiter to enable movement of the limiter latch between said ratchet and pay out configurations.

9. The tie down assembly of claim 8 further comprising a spring biasing the release lever against being raised above said limiter.

10. The tie down assembly of claim 1 wherein with the assembly in the pay out configuration the ratchet wheel is free from engagement with the rotation lock and the pawl and rotatable under resistance of the rotation brake spring biased against the ratchet wheel therein allowing the ratchet wheel to rotate in the pay out direction under pull of the strap under frictional resistance of the rotation brake sufficient to prevent retraction rotation of the ratchet wheel in the retracting direction.

11. The tie down assembly of claim 10 wherein the tie down assembly in the pay-out configuration remains amenable to further pay out after a first pay out by only pulling the strap until the strap is fully unwound from the spool.

12. The tie down assembly of claim 1 wherein in the pay out configuration the ratchet wheel is free from engagement with the rotation lock and the pawl, rotatable under resistance of the rotation brake spring biased against the ratchet wheel therein allowing the ratchet wheel to rotate in pay out direction rotation under pull of the strap under frictional resistance of the rotation brake sufficient to prevent rotation of the ratchet wheel in the retracting direction and further comprising a release lever connected to the rotation brake such that depressing the release lever withdraws the rotation brake from the ratchet wheel progressively as the release lever is depressed such that the strap is retractable by releasing or partially releasing the rotation brake by depressing the release lever with the rate of retraction being user-controlled by partially releasing the rotation brake.

13. The tie down assembly of claim 1 wherein the rotation brake is pivotably mounted to the assembly frame.

14. The tie down assembly of claim 1 wherein the rotation brake engages the ratchet wheel at an underside of the ratchet wheel.

15. The tie down assembly of claim 1 wherein the handle pawl and the rotation brake engage the ratchet wheel rearward of the spool and the rotation lock engages the ratchet wheel forward of the spool.

16. The tie down assembly of claim 1 further comprising a shaft rearward in the assembly frame with the rotation brake pivotably secured thereto.

17. The tie down assembly of claim 16 further comprising a lanyard secured to said shaft and extending therefrom rearward from the assembly.

18. A retractable tie-down assembly including an assembly frame, a spool with a spool axis rotatably mounted on the assembly frame and rotatable in a pay out direction and a retracting direction, at least one ratchet wheel on ends of the spool, the ratchet wheel including ratchet teeth on the ratchet wheel, a strap adapted to be wound on or unwound from said spool with one end attached thereto, a ratcheting handle on a handle frame pivotably connected to the assembly frame and configured to optionally engage said ratchet wheel to rotate said spool in said retracting direction, the improvement comprising, the tie-down assembly configurable between a ratchet configuration and a pay out configuration, in which (a) in the ratchet configuration,
a rotation lock mounted to said assembly frame is operable to lock said ratchet wheel against rotation in said pay out direction by engaging the ratchet wheel,
said ratcheting handle being movably mounted to said assembly frame, the handle including a pawl under spring bias toward continuous engagement of the pawl with the ratchet wheel such that when the handle alone is lifted, the handle and ratchet wheel cooperating to ratchet said spool to rotate in said retracting direction, and
wherein said rotation lock remains in a locking position when said handle is movable to ratchet said ratchet wheel, the rotation lock being under spring bias toward the locking position when the handle rotates the ratchet wheel in the ratchet wheel retracting direction but preventing the ratchet wheel from rotating in said pay out direction, and (b) in the pay out configuration,
said handle is moved downward out of the ratchet configuration effecting a withdrawal of the pawl from engagement with the ratchet wheel and a withdrawal of the rotation lock from engagement with the ratchet wheel, and further comprising a rotation brake pivotably mounted to said assembly frame and urged against the ratchet wheel under a spring bias resulting in a frictional engagement between the ratchet wheel and the rotation brake sufficient to prevent rotation of the ratchet wheel in the retracting direction while allowing the ratchet wheel to rotate in the pay out direction under frictional resistance of the rotation brake, a limiter on said assembly frame dividing handle motion between said ratchet configuration and said pay out configuration and further comprising a limiter latch engaging said limiter on a first side of said limiter in said ratchet configuration or engaging said limiter on a second side of said limiter in said pay out configuration, the limiter preventing the handle from moving out of each of said configurations, a release lever extending from said limiter latch configured such that when said release lever is depressed, the limiter latch is raised above said limiter to enable movement of the limiter latch between said ratchet and pay out configurations, wherein with the limiter latch below the limiter in the pay out configuration, the ratchet wheel is free from engagement with the rotation lock and the pawl, rotatable under resistance of the rotation brake spring biased against the ratchet wheel therein allowing the ratchet wheel to rotate in the pay out direction under pull of the strap under frictional resistance of the rotation brake sufficient to prevent rotation of the ratchet wheel in the retracting direction, wherein the tie down assembly in pay out configuration remains amenable to further pay-out after a first pay-out by only pulling the strap until the strap is fully unwound from the spool.

19. The retractable tie-down assembly of claim 18 wherein the release lever connects to the rotation brake such that depressing the release lever withdraws the rotation brake from the ratchet wheel progressively as the release lever is depressed such that the strap can be retracted by releasing or partially releasing the rotation brake by depressing the release lever with the rate of retraction being user-controlled by partially releasing the rotation brake.

20. A retractable tie-down assembly including an assembly frame, a spool with a spool axis rotatably mounted on the assembly frame and rotatable in a pay out direction and a retracting direction, at least one ratchet wheel on ends of the spool, the ratchet wheel including ratchet teeth on the ratchet wheel, a strap adapted to be wound on or unwound from said spool with one end attached thereto, a ratcheting handle on a handle frame pivotably connected to the assembly frame and configured to optionally engage said ratchet wheel to rotate said spool in said retracting direction, the improvement comprising, the tie-down assembly configurable between a ratchet configuration and a pay out configuration, in which (a) in the ratchet configuration, a rotation lock mounted forward in said assembly frame is adapted to lock said ratchet wheel against rotation in said pay out direction by engaging the ratchet wheel at a ratchet wheel tooth radial side, the rotation lock further comprising a lock plate extending through slits forward in the assembly frame, urged forward in the slits under bias of a lock spring between the assembly frame and the lock plate and wherein as the lock plate engages a tooth of the ratchet wheel the lock plate is pushed against upper sides of the slits therein binding the lock plate from rotation and locking the ratchet wheel from rotation, said ratcheting handle frame movably mounted rotatably on the spool axis, the handle frame further comprising a forward cam urging the rotation lock away from the ratchet wheel when the handle is urged down into said pay out configuration, the handle including a pawl under spring bias toward continuous engagement of the pawl with the ratchet wheel when the handle alone is lifted, the handle and ratchet wheel cooperating to ratchet said spool to rotate in said retracting direction, wherein as the handle is lowered into the pay out configuration, a cam forward cam on the handle frame moves the lock plate away from the ratchet wheel, wherein said rotation lock remains in a locking position when said handle is movable to ratchet said ratchet wheel, the rotation lock being under spring bias toward the locking position, therein allowing the ratchet wheel to rotate in said retracting direction but preventing the ratchet wheel from rotating in said pay out direction, and (b) in which in the pay out configuration, said handle is moved downward out of the ratchet configuration effecting a withdrawal of the pawl from engagement with the ratchet wheel and a withdrawal of the rotation lock from engagement with the ratchet wheel, and further comprising a rotation brake pivotably mounted to said assembly frame and urged against the ratchet wheel under a spring bias resulting in a frictional engagement between the ratchet wheel and the rotation brake sufficient to prevent rotation of the ratchet wheel in the retracting direction while allowing the ratchet wheel to rotate in the pay out direction under frictional resistance of the rotation brake.

21. The tie down assembly of claim 20 further comprising a transverse shaft rearward in the assembly frame with the rotation brake pivotably secured thereto and a lanyard secured to said shaft and extending therefrom rearward from the assembly.

* * * * *